Oct. 2, 1951          R. W. METTLER          2,570,145

FOLDING BOX FORMING MACHINE

Filed July 13, 1949          8 Sheets—Sheet 1

INVENTOR.
ROLLIN W. METTLER
BY
AUSTIN, WILHELM & CARLSON
by Howard G. Russell
ATTORNEYS

Oct. 2, 1951  R. W. METTLER  2,570,145
FOLDING BOX FORMING MACHINE
Filed July 13, 1949  8 Sheets-Sheet 3

Fig. 6

INVENTOR.
ROLLIN W. METTLER
BY
AUSTIN, WILHELM & CARLSON
by Howard G. Russell
his ATTORNEYS Oct. 2, 1951

R. W. METTLER 2,570,145

FOLDING BOX FORMING MACHINE

Filed July 13, 1949

INVENTOR.
ROLLIN W METTLER
BY
AUSTIN, WILHELM & CARLSON by Howard G. Russell
his ATTORNEYS Oct. 2, 1951 R. W. METTLER 2,570,145
FOLDING BOX FORMING MACHINE
Filed July 13, 1949 8 Sheets-Sheet 5

INVENTOR.
ROLLIN W. METTLER
BY
AUSTIN, WILHELM & CARLSON
by Howard G. Russell
his ATTORNEYS Oct. 2, 1951  R. W. METTLER  2,570,145
FOLDING BOX FORMING MACHINE Filed July 13, 1949  8 Sheets-Sheet 7

INVENTOR.
ROLLIN W. METTLER
BY
AUSTIN, WILHELM & CARLSON
by Howard G. Russell
his ATTORNEYS Oct. 2, 1951  R. W. METTLER  2,570,145
FOLDING BOX FORMING MACHINE
Filed July 13, 1949  8 Sheets-Sheet 8

Fig. 23

INVENTOR.
ROLLIN W. METTLER
BY
AUSTIN, WILHELM & CARLSON
by Howard G. Russell
his ATTORNEYS Patented Oct. 2, 1951

2,570,145

UNITED STATES PATENT OFFICE 2,570,145

FOLDING BOX FORMING MACHINE

Rollin W. Mettler, Hamden, Conn., assignor to National Folding Box Company, Inc., New Haven, Conn., a corporation of Connecticut Application July 13, 1949, Serial No. 104,432

6 Claims. (Cl. 93—49)

This invention relates to improvements in automatic machines for setting up folding boxes from flat box blanks and has particular application to machines for setting up hinge-cover boxes.

Hinge-cover boxes require very precise assembly of the body and cover portions of the box, since the accurate fit of the cover depends on the accuracy with which the box body and the box cover are formed. This applies particularly to hinge-cover boxes of the reclosable type having automatic means for maintaining the box cover in closed position. Such locking means commonly include a pair of locking elements on the box cover and on the box body, respectively, one of these elements generally being a hinged flap having an abutment edge, the other element being an edge of a glued-down flap capable of engaging the abutment edge of the hinged flap in edge-to-edge position. The locking elements permit opening of the cover by application of a certain amount of force which causes flexing of the lock flap within the limits of resiliency. Upon reclosing of the cover, the locking elements automatically snap into engagement.

The permissible tolerances in the box dimensions of such reclosable hinge-cover boxes are small, and it is therefore essential to have a machine capable of forming both the box body and the box cover with great and constant accuracy, if waste is to be avoided.

It is manifest that in machines of this type the timing of the various box forming elements is critical and that even slight mistiming or maladjustment results in a misshapen box. Such mistiming or maladjustment may be the result of natural wear of parts, or more frequently it may be the result of accidental jamming of blanks in the machine. If, after the clearing up of a jam, it is discovered that the adjustment of the machine was disturbed, a considerable number of blanks will have passed through or into the machine, all of which are irregular in shape and must be discarded.

The present invention eliminates such waste and disturbance by providing mechanism for squaring the blanks and associated mechanism for forming the box cover, the mechanisms being entirely independent of the rate of travel, or the position of any particular elements on the blank carrying conveyor with respect to fixed or independently operated and timed members. More particularly, the conveyor assembly which moves the box blanks through the machine is so constructed that it accurately squares the blanks and forms the covers by means of self contained mechanism, independent of the rate of advance of the conveyor, and independent of the operation of the feeding mechanism which feeds blanks into the machine.

In line with preferred practice, according to the present invention, a specific cover forming mechanism is associated and combined with a specific box body forming mechanism, and all of the critical elements of these mechanisms are self contained within the conveyor or assembly and are actuated so that formation of the box cover and the box body proceeds substantially simultaneously.

The various objects, features, and advantages of the invention will appear more fully from the detailed description which follows accompanied by drawings showing, for the purpose of illustration, the essential portion of a box machine embodying the invention. The invention also consists in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming part of it in which:

In the following description and in the claims, various details will be identified by specific names for convenience. The names, however, are intended to be as generic in their application as the art will permit. Corresponding reference characters refer to corresponding parts in the several figures of the drawings.

In the drawings accompanying, and forming part of, this specification, certain specific disclosure of the invention is made for the purpose of explanation of broader aspects of the invention, but it is understood that the details may be modified in various respects without departure from the broad principles of the invention and that the invention may be applied to structures other than the ones shown.

Figure 1:
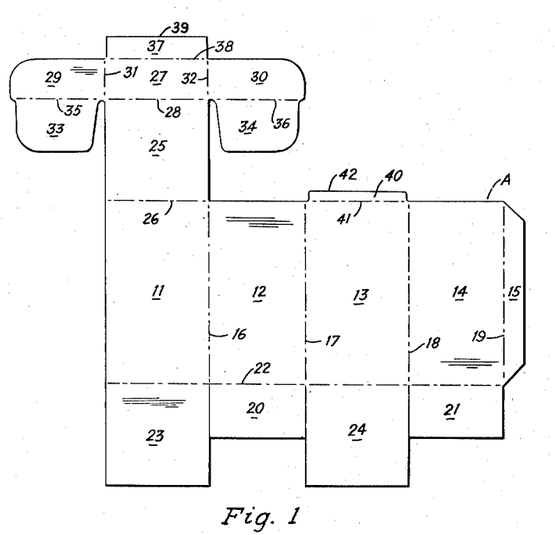
Figure 1 is a flat, cut and scored blank of a reclosable hinge-cover box, the blank being shown in plan view, as it appears after cutting from a larger sheet of paperboard.

The blank A shown in Figure 1 comprises side wall panels 11, 12, 13 and 14 and a terminal glue lap 15 hingedly connected along side fold lines 16, 17, 18 and 19. Bottom flaps 20 and 21 are hingedly connected to the side wall panels 12 and 14, respectively, along a bottom fold line 22, and bottom panels 23 and 24 are hingedly connected to the side wall panels 11 and 12 along the same fold line 22.

The reclosable hinge-cover structure comprises a main cover panel 25 hingedly connected to the side wall panel 11 along a cover fold line 26. A cover front panel 27 is hinged to the main cover panel along a top fold line 28, and cover side panels 29 and 30 are hinged to the cover front panel along front fold lines 31 and 32, respectively. Glue flaps 33 and 34 are hinged to the cover side panels along side fold lines 35 and 36, respectively, and serve to connect the cover side panels to the main panel. An abutment flap 37 is connected to the cover front panel 27 along a fold line 38 and has an abutment or locking edge 39 whose purpose will presently appear.

A lock flap 40 is hingedly connected to the side wall panel 13 along a fold line 41. This lock flap is foldable back upon the side wall panel 13 and its terminal edge 42 is adapted to engage the locking edge 39 of the abutment flap 37 in edge-to-edge relation in the finished carton for the purpose of maintaining the cover locked.

The blank A is shown in the form in which it is cut from a large sheet or roll of foldable stock. It is ready for a preliminary folding and gluing operation which converts the flat blank into a tubular structure ready for setting up into hollow box form on an automatic box forming machine.

Figure 2:
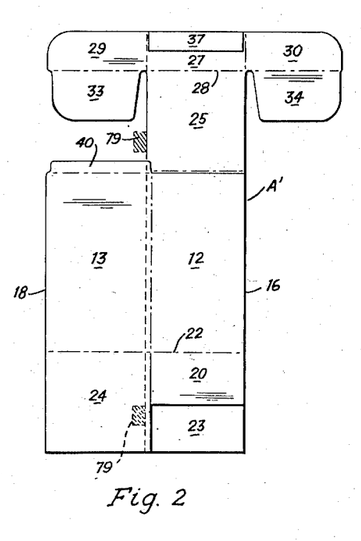
Figure 2 is a plan view of the blank of Figure 1 after initial folding and gluing operations resulting in a tubular flat collapsed blank ready for feeding into a box forming machine.

The blank A is converted into a tubular structure by applying adhesive to the glue lap 15 followed by folding of the blank at the fold lines 16 and 18. This brings the glue lap 15 into adhesive engagement with the side wall panel 11 and brings the side wall panels 12 and 13 into face-to-face contact with the side wall panels 11 and 14, respectively. Likewise, adhesive is applied to the abutment flap 37 and the flap is folded over and adhered to the cover front panel 27. The resulting tubular blank A' is shown in Figure 2. It is ready for setting up into hollow box form.

Collapsed flat tubular blanks A' may be stored and shipped in flat condition requiring a minimum of space. They are immediately available for setting up into hollow box form on automatic machinery.

Figure 3:
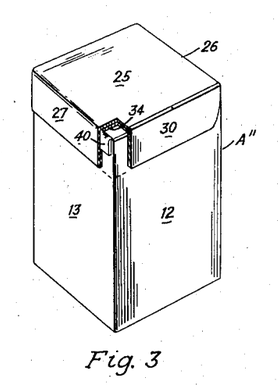
Figure 3 is a perspective view, partly in section, of the completed hinge cover box made from the blank of Figure 2.
Figure 4:
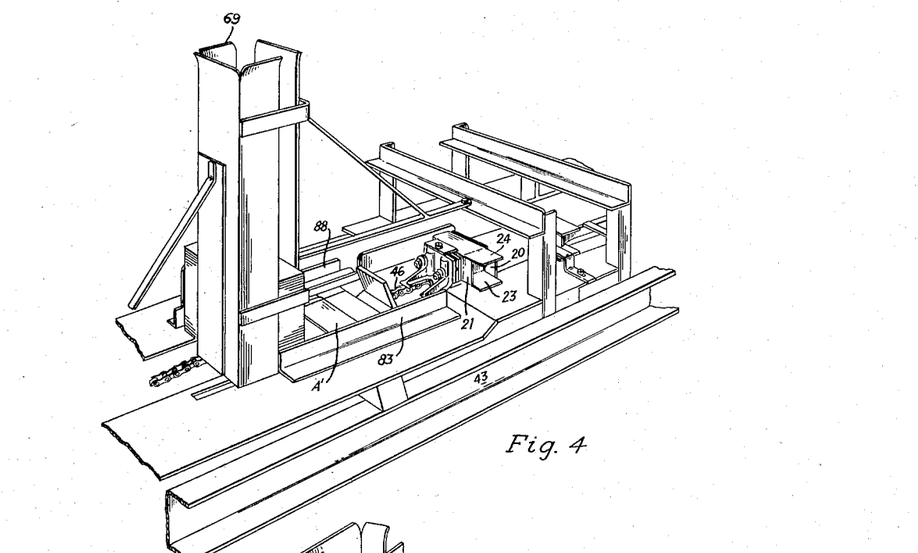
Figure 4 is a perspective view of that portion of a box forming machine which comprises the blank magazine and the beginning of the conveyor which carries the blank through the machine.

An understanding of the construction and operation of the automatic box forming machine about to be described will be facilitated by a brief consideration of the construction of the finished box A'' shown in Figure 3. The box has a squared body portion comprising the wall panels 11, 12, 13 and 14, of which two are visible in Figure 3. The bottom of the box is formed by infolding of the bottom flaps 20 and 21 and by folding thereover the bottom panels 23 and 24, the flaps and panels being adhesively secured to one another.

The hinge cover comprises the main cover panel 25 to which the glue flaps 33 and 34 are adhesively secured, flap 34 being visible at the cutaway portion of the illustrated box. The cover front panel 27 with its abutment flap 37 overlies the lock flap 30 on the top portion of the wall panel 13, the lock flap 30 being downfolded to engage the abutment flap 37 with its free edge.

The hinge cover is opened by swinging it about its hinge line 26 against the resistance of the lock flap 34. The lock flap, together with the upper portion of the wall panel 13, resiliently flexes during the disengagement and returns immediately into operative locking position for relocking the hinge cover upon reclosing of the box.

Figure 23:
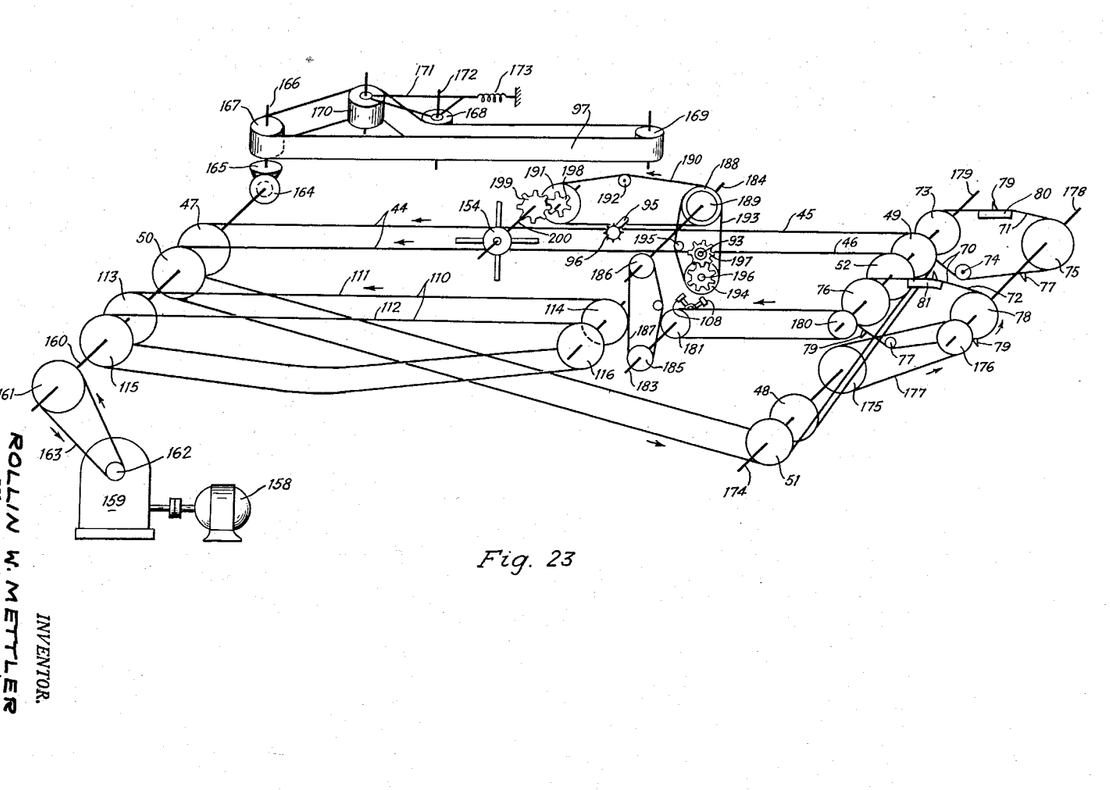
Figure 23 is a diagrammatic perspective view of the drive and conveyor mechanism of the machine.

Referring now to the several illustrations of the box forming machine in connection with a diagrammatic illustration of its major parts, Figure 23, the machine comprises a base 43 upon which an endless first conveyor 44 is mounted. This conveyor consists of a pair of endless chains 45 and 46 trained about gears 47, 48, 49 and 50, 51 and 52, respectively (Figure 23). The chains 45 and 46 of the first conveyor carry a plurality of box forming and blank squaring cages 53 which are shown in greater detail in Figure 6.

Figure 6:
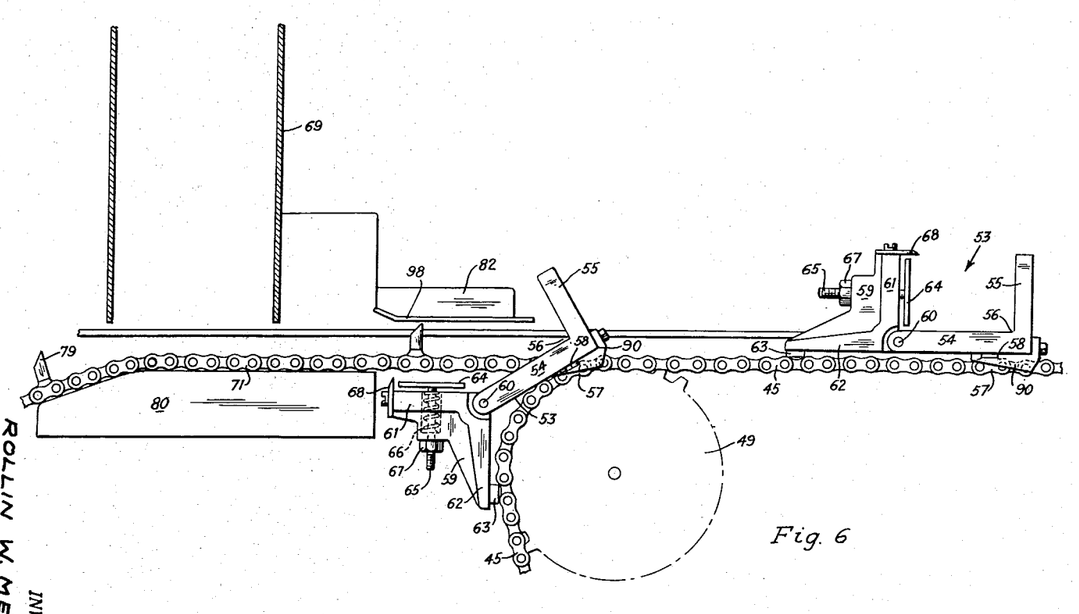
Figure 6 is an elevational view of certain elements of the machine portion shown in Figures 4 and 5.

Each of the cages 53 comprises a bottom member 54 with which an upright end member or lug 55 is integral. The bottom member 54 and the end member 55 form an angle of 90 degrees between them at 56 and are secured to special links 57 of the conveyor chain 45 having upward extensions 58. In a similar manner, the bottom member 54 is connected to the other chain 46 and thus travels with the conveyor relatively to the base 43.

A tiltable end member 59 is hingedly connected to the bottom member 54 at 60 and is free to tilt relatively to the bottom member 54 if the chain permits it to do so. The end member 59 has a normally upright portion or lug 61 and a normally horizontal portion 62 extending at right angles to the portion 61. The horizontal portion 62 carries wear resistant abutments 63 adapted to engage links of the conveyor chains 44 and 45. Only the abutments 63 cooperating with the chain 45 are visible in Figure 6. The movable end member 59 carries a pressure plate 64 mounted on a pair of studs 65 slidable in the upright portion 61 and biased towards the end member 55 by compression springs 66. Nuts 67 permit adjustment of the spacing between the pressure plate 64 and the end member 55. The spacing is made equal to the outside width of the box to be set up, that is the distance between the side walls 12 and 14 measured at the outside of the box.

A projection 68 extends from the upright portion 61 towards the end member 55. It is spaced from the bottom member 54 a distance equal to the depth of the box, that is the distance between the walls 11 and 13 measured at the outside of the box. The projection serves to grasp a flat blank and urge it towards the corner 56, thereby expanding the blank under the force exerted upon it.

As the box forming cage 53 passes over a curved portion of the conveyor path, for example, over the wheels 49 and 52, the tiltable end member 59 tilts back and opens the cage. In the position illustrated in Figure 6, one of the two box forming cages is open for insertion of a flat collapsed blank fed into it from a magazine 59 by a feed conveyor 70.

The feed conveyor is composed of two endless chains 71 and 72 trained over rollers 73, 74, 75 and 76, 77, 78, respectively, and carries feed lugs 79. Specially shaped guide rails 80 and 81 determine the path of the upper flight of the conveyor chains to bring the lugs 79 into proper position to engage the lowermost blank in the magazine 69 and withdraw it towards the conveyor 44 carrying the box forming cages 53. The points at which the lugs 79 engage the blank A' are indicated in Figure 2.

The blank A' travels between vertical guide rails 80 and 81 and moves into an open box forming cage. The feed conveyor 70 disengages from the blank as its lugs withdraw downwardly when the feed conveyor passes over the rollers 73 and 76 (Figure 23).

Figure 5:
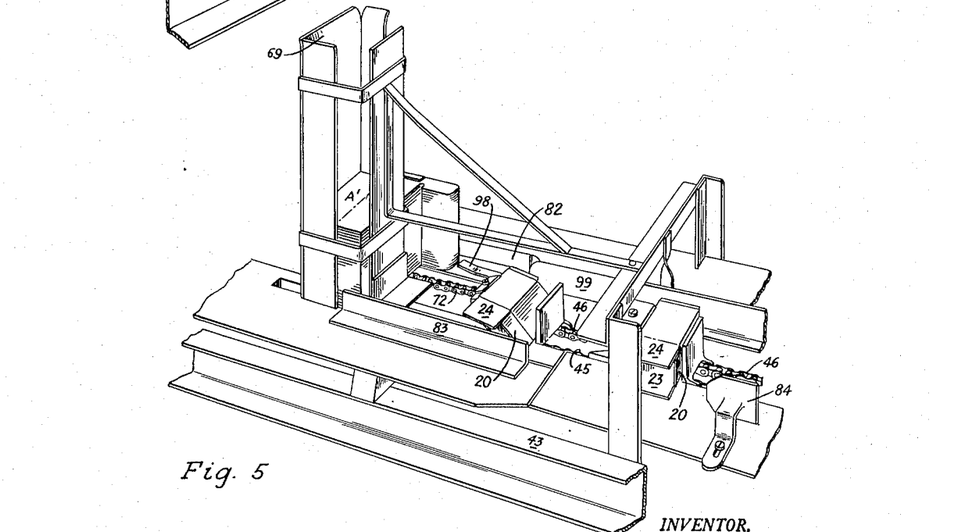
Figure 5 is a perspective view of the machine portion shown in Figure 4 viewed at a different angle and shown at a slightly advanced phase of operation.

The blank is then grasped by the projection 68 of the tiltable end member 59, as the end member slowly moves into upright position. The flat box blank is thus held at one edge by the pressure plate 64 and the projection 68 and is held at its opposite edge by the bottom and end members 54, 55 at the corner 56. The force exerted on the blank A' causes it to open up into square shape. Figure 5 shows one blank in the process of squaring and a second blank fully erected. The cage 53, during its travel along the straight portion of the conveyor 44, maintains the blank accurately squared for performance of the bottom closing and sealing operations which will now be described.

As the squared blank moves on, its end panels 23 and 24 are first engaged by a stationary spreader 84 which spreads the end panels apart and out of the way of the end flaps 20 and 21. While the end panels 23 and 24 are still engaged by the spreader, the leading end flap 20 strikes a stationary sweep 85 which folds the end flap 20 into a position at right angles with respect to the box side walls. Substantially simultaneously, the trailing bottom flap 21 is engaged by an arm 86 of a kicker 87 pivotally mounted at 88 on the base 43. The kicker 87 comprises a cam 89 which is struck by a cam 90 on the cage 53. The kicker moves in a clock-wise sense when actuated by a passing cage and folds the bottom flap 21 into a position substantially at right angles with respect to the box side walls. The infolded trailing bottom flap 21 then comes within the reach of the stationary sweep 85 and is maintained in infolded position while the kicker returns to its rest position in a counter-clock-wise sense under action of a biasing spring (not shown). In its rest position the kicker arm 86 is out of the way of the bottom panel 23 of the succeeding box blank which thus passes over it freely.

Figure 7:
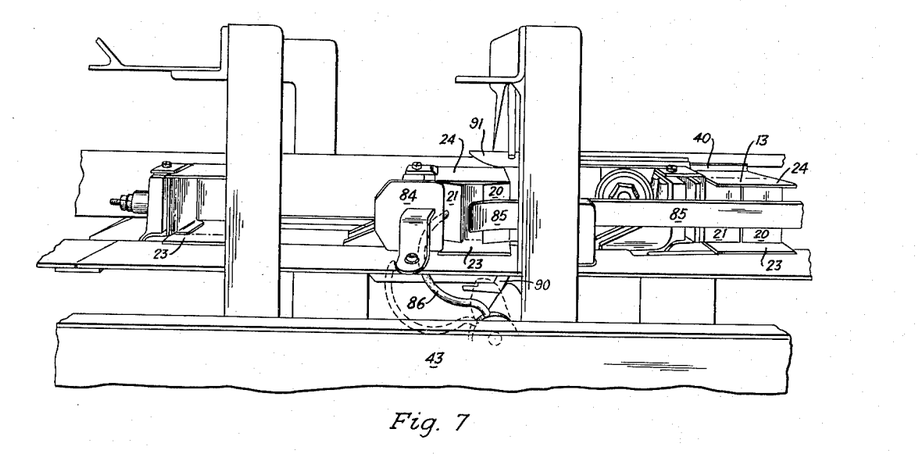
Figure 7 is a perspective view of a further portion of the box machine for sealing the bottom end of the box.
Figure 8:
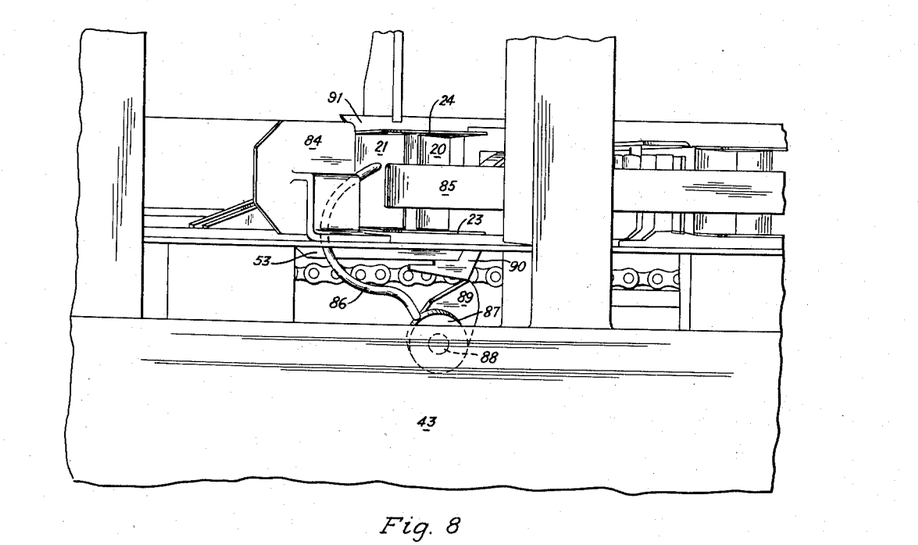
Figure 8 is a detailed view of a portion of the mechanism shown in Figure 7 at a slightly advanced stage of operation.
Figure 9:
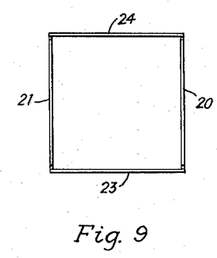
Figures 9 through 16 are diagrammatic illustrations of successive steps in sealing the bottom end of the box.
Figure 10:
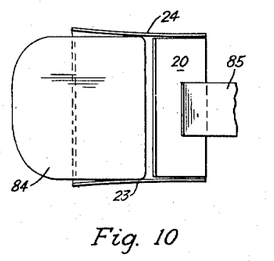
Figure 11:
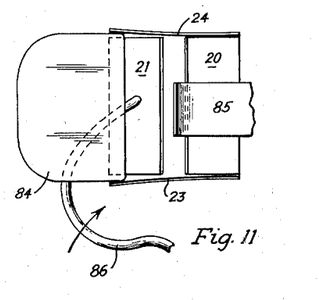
Figure 12:
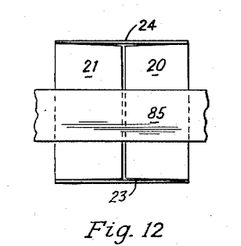

During the folding of the inner end flaps into box closing position, the lock flap 40 of the box moves within the reach of the folding rail 91 which folds the lock flap about its hinge line 41 through an angle of 180 degrees into a position to overlie the box wall panel 13 (Figure 7).

Figure 13:
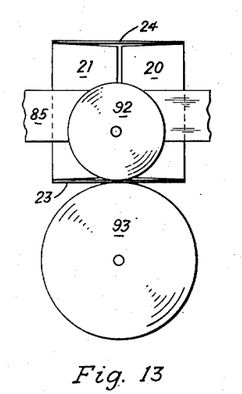
Figure 14:
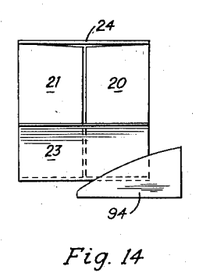
Figure 15:
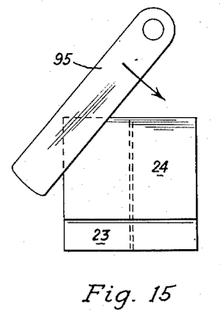
Figure 16:
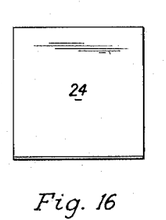
Figure 17:
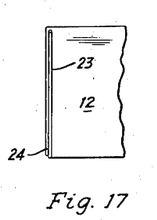
Figure 17 is a side view of the sealed box end shown in Figure 16.

While the inner end flaps 20 and 21 are still engaged by a sweep 85, the inner bottom panel 23 moves past a pair of glue wheels 92 and 93 (Figure 13) which apply adhesive to both sides of the bottom panel 23. The bottom panel 23 then moves within the reach of a stationary plow 94 (Figure 14) which folds the bottom panel into upright position against the infolded bottom flaps 20 and 21. Immediately thereafter a rotary sweep or arm 95 driven by a sprocket wheel 96 engages the outer end panel 24 and folds it into bottom closing position as shown in Figures 15 and 16.

The folded bottom structure is then engaged by a pressure belt 97 (Figure 23) which travels at the same rate as the conveyor 44 and maintains gentle pressure on the outer bottom panel 24 for a time sufficient to permit the adhesive to set.

The sealed bottom maintains the box squared when it is discharged at the end of the conveyor 44. As the conveyor chains 45 and 46 travel over the chain gears 47 and 50, the cages 53 open in a similar manner as illustrated in Figure 6 and the glued boxes drop out.

Figure 18:
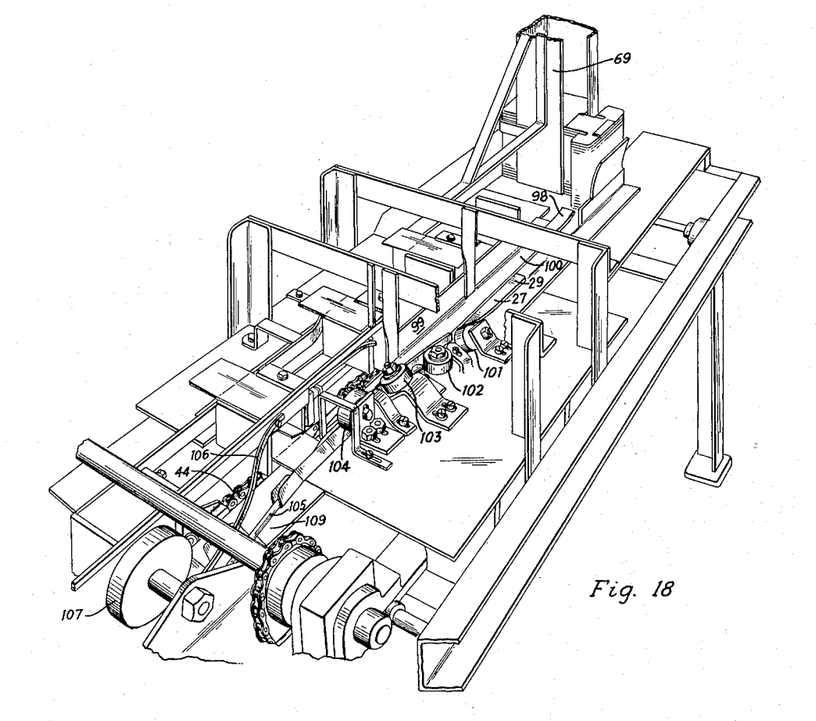
Figure 18 is a perspective view of the portion of the machine for pre-folding the cover panels and flaps and applying adhesive thereto.
Figure 19:
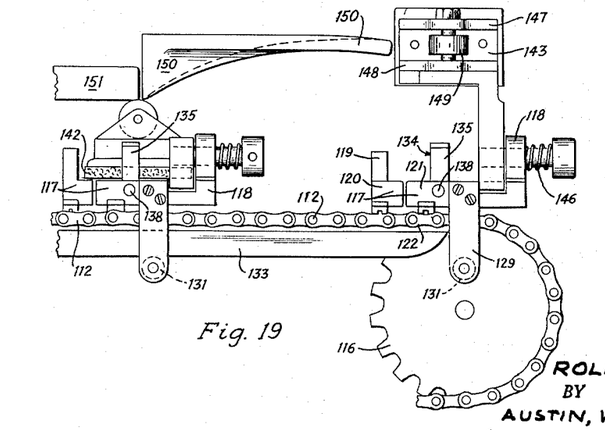
Figure 19 is a side view of two cover shaping forms at successive stages of operation.

Turning now to mechanisms and operations for setting up the hinge cover, the cover panels and flaps of the blank leaving the magazine 69 are first engaged by a guide strip 98 which leads them underneath a rail 99 (Figure 5) of substantially L-shaped cross section whose horizontal portion 100 serves as a sword (Figure 18). The flaps 29, 27 and 30 protrude beyond the sword 100 and are folded over it by a series of folding members which include four rollers 101, 102, 103 and 104. The axis of the first roller 101 lies at an angle of substantially 45 degrees with respect to the horizontal, the axis of the second roller 102 is vertical, the axis of the third roller is inclined substantially 45 degrees with respect to the axis of the second roller, and the axis of the last roller 104 is horizontal. A further roller having a horizontal axis lies underneath the roller 104 to form a nip with roller 104 through which the folded cover assembly passes. This last mentioned roller is not visible in Figure 18 since a folded blank lies directly above it.

The folded flap and panel assembly of the box blank then moves within the reach of a bar 105 diverging slightly with respect to the path of the conveyor 44. The bar 105 unfolds the panels and flaps leaving the nip of the rollers and near its end portion engages the panels 29, 27 and 30 with the result that the flaps 33 and 34 tend to rise due to the previous folding of the stock. Momentarily, however, the flaps 33 and 34 are prevented from doing so by a downwardly extending hold-down bar 106 which guides the flaps underneath an upper pressure roller 107 of a glue applicator whose lower portion comprises spaced cylindrical surfaces of a spot glue wheel 108 shown in Figure 23. The wheel 108 is so timed with respect to the conveyor 44 that its two spaced cylindrical surfaces apply adhesive to the two glue flaps 33 and 34, but not to the main cover panel 25.

As soon as the flaps 33 and 34 emerge from underneath the pressure roller 107 they rise up thus preventing the adhesive on the flaps from soiling the horizontal plate 109 over which they move.

The hinge cover portion of the blank is now ready for folding into hollow form. The cover shaping mechanism comprises a second conveyor 110 composed of endless chains 111 and 112 trained over gears 113, 114 and 115, 116, respectively (Figure 23).

Figures 20, 21, 22:
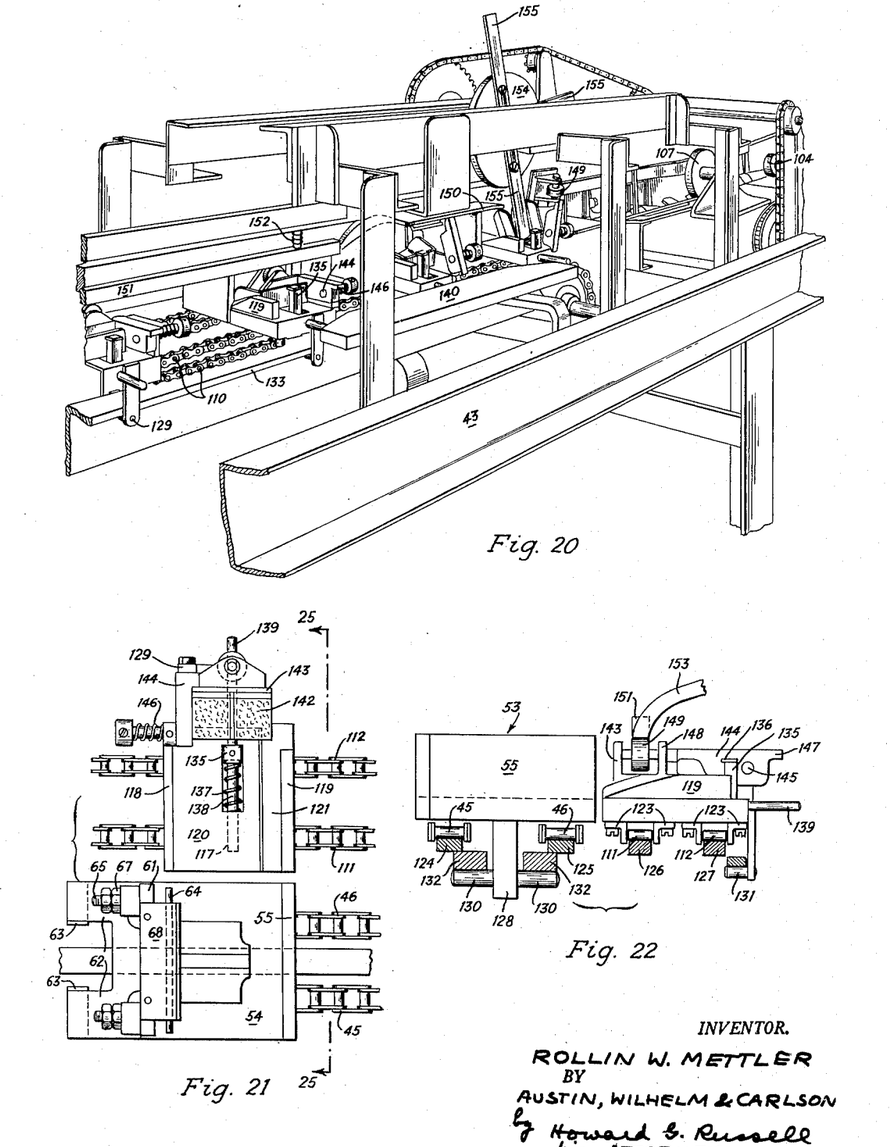
Figure 20 is a perspective view of that portion of the machine which includes the cover shaping forms of Figure 19.
Figure 21 is a plan view of the cover and box body shaping units carried by the conveyor assembly.
Figure 22 is a side view, partly in section, of the mechanism shown in Figure 21, the section being taken on line 22—22 of Figure 21 after movement of the pressure pad 142 into blank engaging position.

Cover shaping forms are mounted on the chains 111 and 112. These forms comprise a base member 117 adapted to receive the main panel 25 of the cover and upright side members 118 and 119 for properly guiding the side panels 29 and 30 of the cover into upright position with respect to the cover main panel. The base member 117 preferably consists of two articulated parts 120 and 121 secured to special links 122 of the chains 111 and 112 having upward extensions 123 (Figure 22). This mounting causes the two portions 120 and 121 of the base 113 to lie flat when the chains 111 and 112 travel along a straight path, in which event the side members 114 and 115 are parallel. When the chains curve around the gears 113, 114, 115 and 116 the base portions 120 and 121 lie at an angle and the side members 118 and 119 tilt outwardly.

The cover shaping forms on the conveyor chains 111 and 112 are spaced equal distances as the cages 53 on the conveyor chains 45 and 46, and the several chains are so dimensioned and timed that the cover shaping elements are accurately aligned with the box body shaping elements when the conveyors run along the straight-line horizontal path extending over the top portion of the machine.

The four conveyor chains 45, 46, 111 and 112 are accurately leveled by tracks or rails 124, 125, 126 and 127 over which they run (Figure 22). The box body and box cover shaping elements are steadied on the chains by downwardly extending arms 128 and 129 bearing rollers 130 and 131 which engage rails 132 and 133.

The cover shaping device comprises further a movable front member 134 adapted to engage the front panel 27 of the cover assembly. The front member 134 is essentially a post 135 provided at its upper end with a projection 136 and slidable with its lower end in a slot 137 in the base plate 120. A horizontal pin 138 extends through the lower end of the post 135 and is slidable in the base plate 120 from which it projects with one end at 139.

The projecting end 139 of the pin 138 is engageable by a flat cam 140 mounted on the machine base 43. As the cover shaping assembly rides past the cam 140 the pin 138 strikes the sloping cam surface and moves the post 135 inwardly against the action of a restoring spring 141 in a direction to erect the cover front panel 27, as will presently appear.

The cover shaping device includes further a pressure pad 142 of resilient material, for example sponge rubber, mounted on a pad base 143 on the end of an arm 144. The arm 144 is pivotally mounted at 145 in the side member 118 and is biased toward a raised position by a torsion spring 146. An extension 147 on the arm 144 provides a stop with which the arm rests against the base 120 in elevated position.

The pad base 143 has two lugs 147 and 148 between which a roller 149 is mounted. A leading plow 150 on the machine base 43 engages the roller 149 and causes the arm to swing down until the pressure pad 142 comes to rest against the base member 117, or a blank on the base member. The pressure pad is maintained in this position by a horizontal rail 151 yieldingly mounted with respect to the machine base 43 at 152. A trailing plow 153 similar to the plow 150, but mounted at the end of the rail 151 permits the pressure pad 142 to return to its elevated position prior to discharge of the glued blank from the cover shaping device.

The folding of the cover flaps and panels into final form proceeds as follows:

The blank whose body portion was squared and whose cover glue flaps are coated with adhesive is moved by the main conveyor 44 towards the point where the second conveyor 110 joins it. As the chains 111 and 112 move around the end gears 114 and 116 (Figure 23) the cover shaping assemblies swing into a position alongside of, and in line with, the box body shaping cages 53. In doing so, a cover shaping assembly rises up underneath each of the cover portions of the blanks traveling through the machine and pushes up the cover flap and panel assembly above it. Immediately thereafter, the cover shaping assembly moves within the reach of a horizontally pivoted sprocket wheel 154 whose vertical sprockets 155 engage the blank and force its main cover panel downwardly between the side members 118 and 119. This causes the cover side panels 29 and 30 to assume a substantially vertical position. Since, due to the initial folding of the cover flaps and panels by the roller 104, the glue flaps 33 and 34 assumed a slanted position with respect to the cover side panels 29 and 30, the glue covered surfaces of the flaps clear the side members 118 and 119 and move over the main panel 25. At this moment the projecting portion 139 of the pin 138 strikes the flat cam 140 and the post 135 moves towards the cover front panel and erects it. The projection 136 on the post holds down the cover front panel to prevent the main cover panel from rising.

As the conveyor advances, the roller 149 on the pressure pad base 143 moves against the leading plow and causes the pressure pad 142 to swing down and press the glue flaps 33 and 34 into adhesive engagement with the main cover panel 25. The pressure is maintained for a time sufficient to permit the adhesive to set whereafter the roller moves onto the trailing plow 153 and the pressure pad assembly returns to its upright position.

At this time the squared and glued box has reached the end of the machine. The four conveyor chains 45, 46, 111 and 112 now curve around the gears 47, 50, 113 and 115 and cause the articulated box body and box cover shaping assemblies to open up and the finished boxes to drop out.

The drive mechanism of the machine is diagrammatically illustrated in Figure 23.

A suitable prime mover, shown as a motor 158, drives a reduction gear 159. The main drive shaft 160 of the machine carries a chain gear 161 driven from the pulley 162 of the reduction gear through a drive chain 163.

The drive shaft 160 carries the chain gears 47 and 50 of the conveyor 44 and also a bevel gear 164 meshing with a further bevel gear 165 on a shaft 166. The shaft 166 carries a belt pulley 167 around which the pressure belt 97 is trained. There are further belt pulleys 168 and 169 stationary with respect to the machine base and a movable belt pulley 170 mounted on a frame 171 pivoted at 172. The frame 171 is under the section of a spring 173 tending to keep the belt 97 under tension.

The chain gears 48 and 51 around which the conveyor chains 45 and 46 are trained are fixed on a shaft 174. Shaft 174 carries a further chain gear 175 driving a gear 176 through a drive chain 177. The gear 176 is fixed on a feeder drive shaft 178 carrying the gears 75 and 78 of the feed conveyor.

The chain gears 49 and 52 of the conveyor chains 45 and 46 are fixed on a shaft 179. The gears 73 and 76 of the feed conveyor are loosely mounted on the shafts 179 to rotate freely thereon. A pulley 180 is fixedly mounted on the shaft 179 and drives a chain gear 181 through a chain 182. The gear 181 is fixed on a shaft 183 driving a further shaft 184 through gears 185 and 186 and a drive chain 187. The shaft 184 carries a pair of chain gears 188 and 189. The gear 188 drives a chain 190 trained over a further gear 191 and a tension pulley 192. The chain 190 engages the sprocket wheel 96 of the rotary sweep 95 and drives it. The rotary sweep thus moves at a predetermined rate with respect to the rate of advance to the conveyors 44 and 110.

The chain gear 191 is coupled with a spur gear 198 meshing with a further spur gear 199 on a shaft 200 which carries the sprocket wheel 154. The sprocket wheel thus revolves at a predetermined rate with respect to the rate of advance of the conveyor 110.

The gear 189 drives a chain 193 trained around a further gear 194 and a tension pulley 195. A spur gear 196 turns with the chain gear 194 and meshes with a second spur gear 197 driving the glue wheel 93.

The invention thus provides an improved form of machine for squaring collapsed flat box blanks and forming and gluing a box cover integral with the box body. The squaring operation as well as the folding and gluing operations of the box body and the box cover are all controlled by the advance of the conveyor which moves the blanks through the machine resulting in great accuracy of performance.

What is claimed is:

1. A machine for setting up into box shape the cover portion of a flat box blank comprising a box body portion and a hinged cover portion including a main cover panel hinged to the body portion, a cover front panel, cover side panels, and glue flaps for securing said side panels to said main panel, the machine comprising, a first conveyor; lugs on said first conveyor for engaging a box blank at its body portion; a second conveyor side by side with said first conveyor; means for moving said first and said second conveyor in timed relationship; a cover shaping form on said second conveyor, said form comprising a base member adapted to receive the main panel, and side members upright with respect to the base member for guiding the side panels into set up position; means for urging said front panel between said side members, thereby causing the side panels to assume an angular position with respect to the front panel; and means on said second conveyor for engaging said glue flaps to urge said flaps towards the base member into surface-to-surface engagement with the main panel.

2. A machine for setting up into box shape the cover portion of a flat box blank comprising a box body portion and a hinged cover portion including a main cover panel hinged to the body portion, a cover front panel, cover side panels, and glue flaps for securing said side panels to said main panel, the machine comprising, a base; an endless first conveyor mounted on said base; lugs on said first conveyor for engaging a box blank at its body portion; a second endless conveyor mounted on said base side by side with said first conveyor; means for moving said first and said second conveyor in timed relationship; a cover shaping form on said second conveyor, said form comprising a base member adapted to receive the main cover panel, and side members upright with respect to the base member for guiding the side panels; means on said base and driven in timed relationship with respect to said second conveyor for urging said front panel between said side members, thereby causing the side panels to assume an angular position with respect to said front panel; means for folding said front panel into set up position with respect to said main panel; and means on said second conveyor for engaging said glue flaps to urge said flaps towards the base member into surface-to-surface engagement with the main panel.

3. A machine for settink up into box shape the cover portion of a flat box blank comprising a box body portion and a hinged cover portion including a main cover panel hinged to the body portion, a cover front panel, cover side panels, and glue flaps for securing said side panels to said main panel, the machine comprising, a base; an endless first conveyor mounted on said base; lugs on said first conveyor forming a plurality of compartments between them adapted to convey box blanks by their body portions; a second endless conveyor mounted on said base side by side with said first conveyor, said second conveyor being shorter than the first conveyor but terminating evenly with said first conveyor; means for moving said first and said second conveyor at an equal linear rate of movement; a plurality of cover shaping forms on said second conveyor spaced evenly with the said compartments on the first conveyor and aligned therewith within a portion of the paths of said conveyors, said forms comprising a base member adapted to receive the main cover panel, and side members upright with respect to the base member for guiding the side panels; a sprocket wheel on said base driven in timed relationship with respect to said second conveyor for urging said front panel between said side members, thereby causing the side panels to assume an angular position with respect to said front panel; means on said second conveyor for folding said front panel into set up position with respect to said main panel; and means on said second conveyor for engaging said glue flaps to urge flaps towards the base member into surface-to-surface engagement with the main panel.

4. A machine for setting up into box shape the cover portion of a flat box blank comprising a box body portion and a hinged cover portion including a main cover panel hinged to the body portion, a cover front panel, cover side panels, and glue flaps for securing said side panels to said main panel, the machine comprising, a base; an endless first conveyor mounted on said base; lugs on said first conveyor forming a plurality of compartments between them adapted to convey box blanks by their body portions; a second endless conveyor mounted on said base side by side with said first conveyor, said second conveyor being shorter than the first conveyor but terminating evenly with said first conveyor; means for moving said first and said second conveyor at an equal linear rate of movement; a plurality of cover shaping forms on said second conveyor spaced evenly with the said compartments on the first conveyor and aligned therewith within a portion of the paths of said conveyors, said forms comprising a base member adapted to receive the main cover panel, side members upright with respect to the base member for guiding the side panels, a movable front member adapted to engage said front panel for folding the front panel into set up position, and a movable pressure pad for engaging said glue flaps to urge said flaps towards the base member into surface-to-surface engagement with the main panel; a sprocket wheel on said base driven in timed relationship with respect to said second conveyor for urging said front panel between said side members, thereby causing the side panels to assume an angular position with respect to said front panel; and cam surfaces on said base for actuating said movable front member and said pressure pad at predetermined positions along the path of the second conveyor.

5. A machine for setting up into box shape the cover portion of a flat box blank comprising a box body portion and a hinged cover portion including a main cover panel hinged to the body portion, a cover front panel, cover side panels, and glue flaps for securing said side panels to said main panel, the machine comprising, a base; an endless first conveyor mounted on said base; lugs on said first conveyor forming a plurality of compartments between them adapted to convey box blanks by their body portions; a second endless conveyor mounted on said base side by side with said first conveyor, said second conveyor being shorter than the first conveyor but terminating evenly with said first conveyor; means for moving said first and said second conveyor at an equal linear rate of movement; a plurality of cover shaping forms on said second conveyor spaced evenly with the said compartments on the first conveyor and aligned therewith within a portion of the paths of said conveyors, said forms comprising a base member adapted to receive the main cover panel, a fixed side member upright with respect to the base member, a movable side member mounted on said second conveyor for tilting with respect to the base member out of its upright position when the conveyor moves along a curved path, a movable front member adapted to engage said front panel for folding the front panel into set up position, and a movable pressure pad on said form for urging said flaps towards the base member into surface-to-surface engagement with the main panel; a sprocket wheel on said base driven in timed relationship with respect to said second conveyor for urging said front panel between said side members, thereby causing the side panels to assume an angular position with respect to said front panel; and two cam surfaces on said base for successively engaging and releasing first said movable front member and then the pressure pad.

6. A machine for setting up into box shape the cover portion of a flat box blank comprising a box body portion and a hinged cover portion including a main cover panel hinged to the body portion, a cover front panel, cover side panels, and glue flaps for securing said side panels to said main panel, the machine comprising, a base; two parallel tracks on said base; a pair of endless conveyor chains mounted on said base and extending over said tracks to run side by side and parallel with each other for the length of the tracks; means for driving said two conveyor chains at equal linear speed; compartments on said first conveyor adapted to engage blanks by their body portions; an arm on each of said compartments engaging one of said tracks to steady the compartment with respect to the track; a plurality of cover shaping forms on said second conveyor chain spaced evenly with the said compartments and aligned therewith within the length of said tracks, each of said forms comprising a base member adapted to receive the main cover panel, side members upright with respect to the base member for guiding the side panels, a movable front member adapted to engage said front panel for folding the front panel into set up position, an arm on said base member engaging the other of said tracks to steady the base member on said other track, and a movable pressure pad on said form for engaging said glue flaps to urge said flaps towards the base member into surface-to-surface engagement with the main panel; a sprocket wheel on said base driven in timed relationship with respect to said second conveyor for urging the front panel of a blank between said side members, thereby causing the side panels to assume an angular position with respect to said front panels; means biasing said movable front member towards a disengaged position with respect to said front panel; means biasing said pressure pad towards a disengaged position with respect to said base member; a first cam on said base alongside said second conveyor for moving said front member towards said front panel; and a second cam on said base alongside said second conveyor for moving said pressure pad towards said base member.

ROLLIN W. METTLER.

REFERENCES CITED

The following references are of record in the file of this patent:

UNITED STATES PATENTS

| Number | Name | Date |
|---|---|---|
| 2,441,445 | Ringler et al. | May 11, 1948 |
| 2,448,198 | Terrent | Aug. 31, 1948 |